J. BUCHEL.
PRESSURE CONTROLLING DEVICE.
APPLICATION FILED MAY 28, 1917.
1,305,059.
Patented May 27, 1919.
2 SHEETS—SHEET 1.
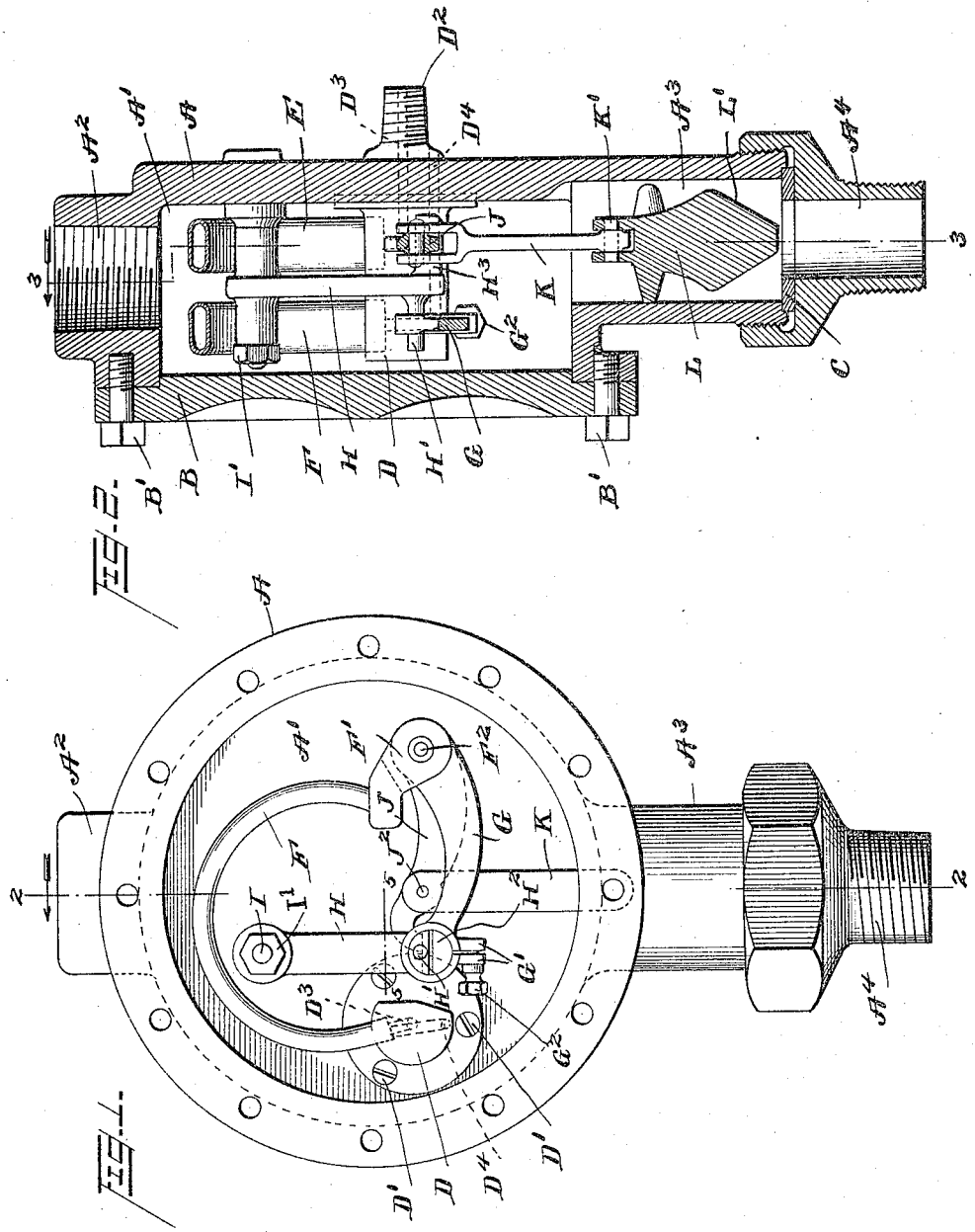
WITNESS:
Harold Strauss
INVENTOR
Jules Buchel
BY Francis T. Chambers
HIS ATT'Y.

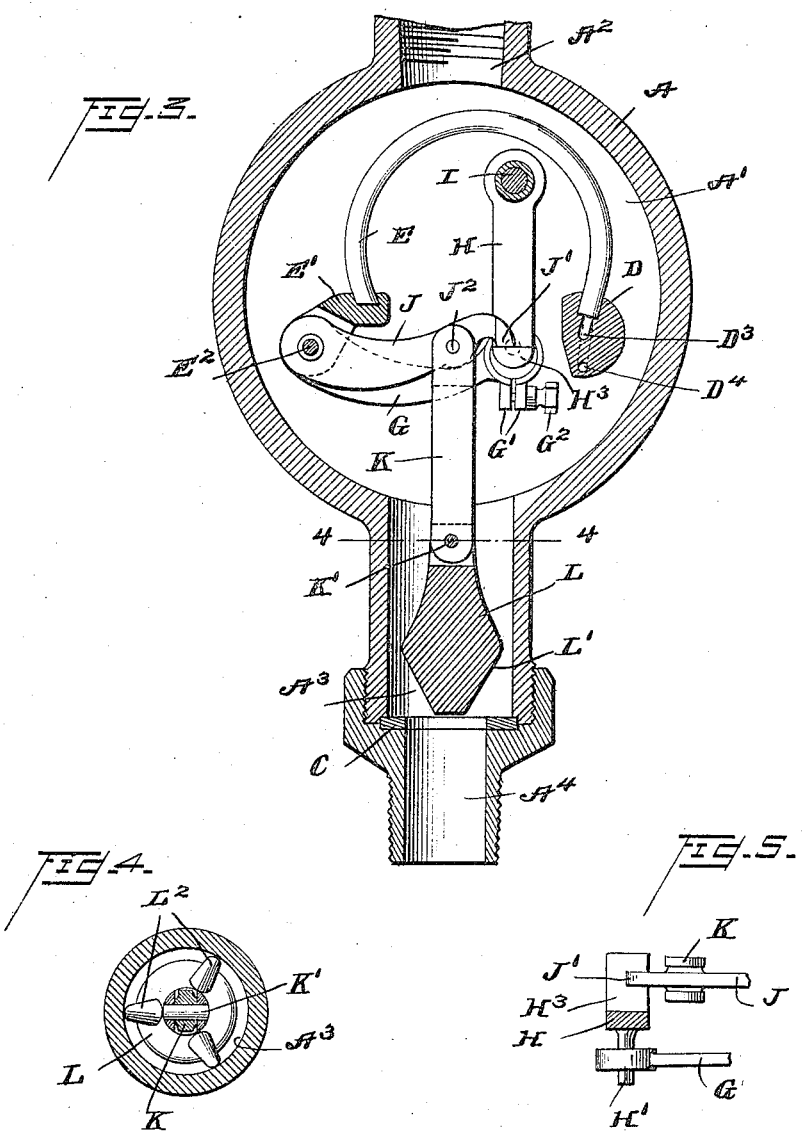

UNITED STATES PATENT OFFICE.

JULES BUCHEL, OF NEW ORLEANS, LOUISIANA, ASSIGNOR TO WILLIAM J. KELLY, OF HAVERFORD, PENNSYLVANIA.

PRESSURE-CONTROLLING DEVICE.

1,305,059.  Specification of Letters Patent.  Patented May 27, 1919.

Application filed May 28, 1917. Serial No. 171,388.

*To all whom it may concern:*

Be it known that I, JULES BUCHEL, a citizen of the United States of America, residing in New Orleans, in the parish of Orleans, in the State of Louisiana, have invented certain new and useful Improvements in Pressure-Controlling Devices, of which the following is a true and exact description, reference being had to the accompanying drawings, which form a part thereof.

My present invention consists in novel means for interrupting the flow of a fluid through a conduit in response to a predetermined variation in the pressure of another fluid not passing through the conduit, and the general object of my invention is to provide simple and effective means for the purpose specified.

The various features of novelty which characterize my invention are pointed out with particularity in the claims annexed hereto and forming a part of this specification; for a better understanding of the invention, however, and of its advantages and specific objects attained, reference should be had to the accompanying specifications and drawings in which I have illustrated a preferred embodiment of my invention.

Of the drawings Figure 1 is an elevation of the apparatus with the front cover plate removed. Fig. 2 is a section taken on the lines 2—2 of Fig. 1. Fig. 3 is a rear elevation with parts in section on the broken line 3—3 of Fig. 2. Fig. 4 is a section on the line 4—4 of Fig. 3, and Fig. 5 is a section taken on the line 5—5 of Fig. 1.

The apparatus, in the preferred form illustrated on the drawings, comprises a main casing member A, formed with a cylindrical chamber $A'$, open at one end, and with an upper inlet $A^2$ and a lower outlet $A^3$. The inlet $A^2$ is internally threaded to receive a standard pipe connection, and the outlet $A^3$ is externally threaded to receive a pipe fitting part $A^4$. Between the end of the outlet $A^3$ and the fitting $A^4$ is secured a washer C, which serves as a gasket to make a tight joint between these parts and also as a valve seat member. The open end of the chamber $A'$ is normally closed by a front cover plate B, which is secured in place by bolts $B'$.

A stud or post D, advantageously formed of steel and provided with a flanged base, is located within a chamber $A'$, and is secured against the rear wall of the chamber by screws $D'$. This stud is provided with a portion $D^2$ projecting through an aperture formed for the purpose in the rear wall of the chamber. The external end of the portion $D^2$ is externally threaded to receive a pipe connection. Located side by side within the chamber $A'$ are a pair of curved tubes E and F, each of which is soldered or otherwise suitably secured at one end to the stud D. The latter is formed with a passage $D^3$ which communicates at its inner end with the interior of the tube E and has its outer end axially disposed in the threaded portion $D^2$ of the stud. The stud D is also formed with a passage $D^4$ open to the atmosphere at its outer end, and communicating at its inner end with the interior of the tube F.

The end of the tube F remote from the stud D is soldered, or otherwise secured, to an end member $F'$, which closes the end of the tube passage and is provided with bracket ears between which one end of an arm or connecting rod G is journaled on a pivot pin $F^2$. The other end of the arm G is pivotally connected to the lower end of a swinging link H, which has its upper end journaled on a stud I secured to the rear wall of the casing A. To permit of an adjustment of the distance between the lower end of the link H and the end member $F'$, the connection between the link H and arm G is formed by means of a member $H^2$, which is rotatably mounted in a split collar formed at the end of the arm G. The member $H^2$ may be clamped in any desired angular relation with the member G by means of the clamping screw $G^2$, connecting the lugs $G'$ formed at the ends of the split collar. The member $H^2$ is formed with an eccentrically disposed aperture forming the bearing for a pivot stud $H'$, carried by the link H. For added security the member may be externally threaded and the collar receiving it is then correspondingly threaded internally.

The end of the curved tube E, remote from the stud D, is provided with an end member $E'$ (see Fig. 3) similar to the end member $F'$. A pivot pin $E^2$ pivotally connects the end member $E'$ to one end of a trip arm J. The opposite end $J'$ of the arm J normally rests upon the flat upper side of a lug H³, carried by the lower end of the link H. A depending link or connecting rod K is pivotally connected at its upper end to the arm J adjacent the end J' of the latter. The lower end of the link or connecting rod K is pivotally connected by the pivot pin K' to the upper end of a valve member L, which works freely in the outlet passage A³, and does not fill the latter. The lower portion L' of the valve member L is made conical. When the end J' of the arm J bears on the lug H³, the valve member L does not obstruct the flow out of the chamber A' through the outlet passage A³ and the hollow fitting A⁴, but when the arm J and lug H³ disengage, as hereinafter explained, the valve member L drops into the position into which it engages the valve seat member C and closes the passage through the latter, which, as well as the passage through the fitting A⁴, is smaller in diameter than the large diameter portion of the valve L. The upper portion of the valve member L is provided with centering lugs L², which tend to hold the valve member central with respect to the outlet passage A³.

With the construction described an increase in pressure within the tube E tends to straighten tube E and thereby move the end member E' away from the arm H, and when the increase of pressure reaches the amount for which the apparatus is set to respond the end J' of the arm J is moved off the lug H³ and the valve member L drops into engagement with the valve seat member C and closes the outlet from the chamber A'. A variation in the pressure within the chamber A' does not disturb the relative position of the end J' of the arm J and the lug H³, however, since the two tubes E and F are straightened or flexed in the same way and to the same amount by an increase or decrease of pressure in the chamber A', regardless of what the internal pressures in the tubes E and F may be. When the two tubes E and F are similarly straightened or flexed the end J' and the arm J and the lug H³ are given similar movements.

The apparatus in the form shown in the drawings was especially devised for use in refrigerating apparatus in which the fluid passing through the chamber A' is steam at a relatively high pressure, say 200 lbs. or so, and the fluid admitted to the interior of the tube E is ammonia. For such use the valve member L, and all the other movable parts of the mechanism, except the tubes E and F and their end pieces E' and F' may advantageously be made of some suitable hard and non-corrodible material, such as aluminum bronze, while the remainder of the apparatus, with the exception of the valve seat member C, may be made of iron and steel. The valve seat member C may advantageously be made of Babbitt metal or copper, and is preferably formed with a sharp corner at the edge engaged by the valve L, so that the slight deformation occurring when the valve seats, and the relatively small areas of contact will minimize the possibility of leakage.

To adjust the member H² in its seat and thereby vary the pressure at which the valve trips it is necessary to remove the cover plate B. To open the valve and reset the mechanism after the valve has tripped, it is necessary to remove the cover plate B, or to remove the fitting A⁴, or some fitting member connected thereto, and thereby making it possible to engage the lower end of the valve and force it upward until the end J' of the arm J cams the lug H³ to one side and then passes above the latter. The fact that the adjustment of the mechanism and the resetting of the valve are not particularly easy of accomplishment with the form of construction shown is an advantage rather than otherwise, in view of the fact that the device is intended for use as a safety device, which ordinarily will trip only at infrequent intervals, and which should require adjustment under ordinary conditions only in rare instances and should not be adjusted except by authorized persons.

While the valve will ordinarily not trip and close except at rare intervals, the various moving parts will be almost continually in motion because of variations in temperature and pressure constantly occurring in practice, and this is a decided advantage in that it keeps the various bearing and trip contact surfaces clean, and prevents them "freezing" together under the corrosive influence to which they are subjected. While the effect of corrosion on the steel tubes E and F will tend to weaken the tubes in time, this weakening of the tubes in no wise impairs the capacity of the apparatus to operate as a safety device. The only effect of the tube weakening is to lower the maximum ammonia pressure in the tube E required to trip the valve. The avoidance of stuffing boxes is of especial importance in apparatus for handling ammonia under pressure. Under certain conditions of use as in refrigerating apparatus in which kerosene or like fuel oil is passed through the chamber the pressure of the fluid passing through the chamber A' may be small in comparison with the pressure in the tube E. In such cases it may be advantageous to simplify the apparatus disclosed by eliminating the provisions made for compensating for variations in pressure within the chamber A'. This simplification may be effected, with the particular apparatus disclosed, by simply removing the arm G and tube F and closing up the passage D⁴. With these parts removed the lug H³ should he held stationary and this may be accomplished, for example, by tightening the nut I' on the stud I, so as to clamp the hub of the link H rigidly to the casing A in the desired adjustment of the link.

While in accordance with the provision of the statutes I have illustrated and described the best form of my invention now known to me, those skilled in the art will understand that changes may be made in the form of the apparatus disclosed without departing from the spirit of the invention claimed herein, and certain features of my invention may some time be used to advantage without a corresponding use of other features.

Having now described my invention, what I claim as new and desire to secure by Letters Patent, is:

1. The combination of a chambered valve casing, a valve in said casing controlling fluid flow therethrough, and means releasably holding said valve in one position comprising a hollow element adapted to expand and contract on variations in the differential of the internal and external pressures to which it is subjected and provisions for connecting the interior of said element to a source of pressure external to said casing, and means for neutralizing the effect on said valve holding means of a variation in the pressure acting externally on said element.

2. The combination with a chambered valve casing of a valve in said casing controlling the flow therethrough, a pair of coöperating latching parts normally in engagement and holding said valve in one position, pressure responsive elements connected to said parts and adapted to giving similar movements to said parts on variations in the pressure in said casing, and provisions for subjecting one of said elements to a source of pressure external to said casing whereby said latching parts will disengage on a predetermined variation of the last mentioned force, but will not disengage on variations of the pressure in said casing.

3. In combination a valve casing formed with a fluid thoroughfare and with a passage through its wall, a valve in said casing controlling the flow through said thoroughfare and means for releasably holding said valve in one position comprising a curved tube, closed at one end and having its opposite end connected to the casing, and communicating with said passage through its wall, and a pair of coöperating latching parts one of which is connected to said tube.

4. In combination a valve casing, formed with a thoroughfare for fluid and with two passages in its wall opening at the outer side of the casing, a valve controlling the flow through said thoroughfare, and means for releasably holding said valve in one position comprising a pair of curved tubes located in said casing, and each closed at one end and having its opposite end connected to the casing and communicating with a corresponding one of said passages, and a pair of coöperating latching parts, one connected to one and the other to the second of said tubes.

5. In combination a valve casing formed with an aperture in its wall, a valve located in said casing and means for releasably holding said valve in one position comprising a support projecting through and closing said aperture, a pair of curved tubes each closed at one end and having its opposite end secured to said support, and a pair of coöperating latching parts connected one to one and the other to the second of said tubes, said support being formed with two passages leading through the wall of the casing, and each communicating at its inner end with the interior of one of the tubes.

6. In combination, a chambered valve casing, a valve in said casing controlling flow therethrough, coöperating latching parts in said casing normally in engagement and holding said valve in one position, means for disengaging said parts comprising a hollow element connected to one of said parts and adapted to move the latter on variations in the difference between the pressures acting internally and externally on said element, provisions for connecting the interior of said element to a source of pressure external to said casing, and provisions for varying the normal relative arrangement of said latching parts and element.

7. In combination, a valve casing formed with a thoroughfare for fluid and with two passages in its wall opening at the outer side of the casing, a valve controlling the flow through said thoroughfare, means for releasably holding said valve in one position comprising a pair of curved tubes located in said casing, and each closed at one end and having its opposite end connected to the casing and communicating with a corresponding one of said passages, a latching part connected to one of said tubes, and a coöperating latching part adjustably connected to the second of said tubes.

8. In combination, a valve casing formed with a thoroughfare for fluid and with two passages in its wall opening at the outer side of the casing, a valve controlling the flow through said thoroughfare, means for releasably holding said valve in one position comprising a pair of curved tubes located in said casing, and each closed at one end and having its opposite end connected to the casing and communicating with a corresponding one of said passages, a linked structure comprising a pair of links pivotally connected to each other and one pivotally connected to said casing and the other to the closed end of one of said tubes, a latching part carried by said structure, and a coöperating latching part connected to the closed end of the second tube.

9. In combination, a valve casing formed with a thoroughfare for fluid and with two passages in its wall opening at the outer side of the casing, a valve controlling the flow through said thoroughfare; means for releasably holding said valve in one position comprising a pair of curved tubes located in said casing, and each closed at one end and having its opposite end connected to the casing and communicating with a corresponding one of said passages; a linked structure comprising a pair of links pivotally connected to each other and one pivotally connected to said casing and the other to the closed end of one of said tubes, a latching part carried by said structure, and a coöperating latching part connected to the closed end of the second tube; said linked structure being adjustable to vary the normal relative positions of said latching parts.

JULES BUCHEL.

Copies of this patent may be obtained for five cents each, by addressing the "Commissioner of Patents, Washington, D. C."